United States Patent [19]

Kehoe et al.

[11] Patent Number: 5,246,490

[45] Date of Patent: Sep. 21, 1993

[54] WATER SOLUBLE LIQUID ALGINATE DISPERSIONS

[75] Inventors: Joseph D. Kehoe, Cary; Margaret K. Joyce, Raleigh, both of N.C.

[73] Assignee: Syn-Chem, Inc., Raleigh, N.C.

[21] Appl. No.: 918,554

[22] Filed: Jul. 22, 1992

[51] Int. Cl.⁵ .................................................. C08L 5/04
[52] U.S. Cl. ..................................... 106/189; 106/198; 106/208
[58] Field of Search ..................... 106/189, 197.2, 198, 106/208, 170

[56] References Cited

U.S. PATENT DOCUMENTS

| | | | |
|---|---|---|---|
| 3,282,717 | 11/1966 | Kelly | 106/208 |
| 3,894,880 | 7/1975 | Colgrove | 106/208 |
| 4,465,517 | 8/1984 | Shields | 106/208 |

Primary Examiner—David Brunsman
Attorney, Agent, or Firm—Olive & Olive

[57] ABSTRACT

Water soluble alginates are prepared as highly concentrated pumpable suspension in mixtures of propylene glycol and water using hydroxypropylated guar gum in combination with carboxymethylated cellulose as a suspending agent. The total composition of hydroxypropylated guar is preferably between about 0.2 and 5%, suspending between about 15% and 35% alginate.

10 Claims, No Drawings

WATER SOLUBLE LIQUID ALGINATE DISPERSIONS

BACKGROUND OF THE INVENTION

1. Field of the Invention

This invention relates to alginates, and in particular, to methods of placing water-soluble alginates in liquid form.

2. Description of the Related Art

Alginates are hydrocolloids which are commercially extracted from brown marine microalgae. Water soluble alginates are widely used in many industries, e.g., paper, textiles, paint, oil drilling, pharmaceuticals and food. For instance, in small percentages they are found in high solids paper coatings and textile print pastes as rheological control (thickening) agents. Alginates are also widely used in foods such as frozen deserts, salad dressings, dairy products, bakery products and beverages. Many of the applications for these industrial systems are fully automated with the exception of feed systems for alginates which utilize an eductor (FIG. 1) or a dry feeder, both of which systems are subject to clogging. In addition, using an eductor can be cumbersome.

Alginates are commonly furnished in granular form, with the particle size generally ranging from as coarse as 20 mesh (U.S. standard sieve) to about 200 mesh. The hydrophilic nature of these polysaccharide gums which make them useful thickening agents, leads to difficulty when such polymers are added to water. There is a tendency for the individual particles to undergo surface swelling and stick to each other, generally trapping air inside an aggregate of the partially swollen granules. These aggregates, or "lumps," are very difficult to redisperse because the entrapped bubbles resist the penetration of water, and it is difficult for water to penetrate into the interior of a lumpy aggregate.

Previously, the alginates have had to be added as dry powders which was inconvenient for the end users of the product. To obtain a pumpable product and yet avoid the problem of trying to suspend alginates in water, other types of suspensions or dispersions have been tried. For example, in the patent of Colgrove (U.S. Pat. No. 3,894,880) an alginate is dispersed in water and alcohol using 0.3–1.0% xanthan gum as the suspending agent. Xanthan gum is a hydrophilic colloid. About 12–28.5% isopropanol was found to provide a blend of satisfactory viscosity. There are disadvantages to using non-aqueous solvents such as alcohol, including flammability, toxicity, possible environmental problems, and interference with uses of the alginate.

Another liquid thickener which is being used in the textile and paper industries is an alkali-swellable synthetic polymer, ALCOGUM TM (Alco Chemical Corporation). Although its rheological and water retention properties are similar to that of alginates, its chemistry and functionality are quite different. The ALCOGUM TM products are emulsions and not suspensions, which are synthesized by polymerizing methacrylic acid and ethylacrylate to yield polymers of varying properties. Due to their chemistry the ALCOGUM TM products require alkali to activate their viscosity functionality. Ammonia is the usual base used to neutralize the acid groups and promote swelling. These products have the disadvantages that in addition to requiring the handling of ammonia, the products are in the form of lattices and lose their functionality when frozen. The frozen polymeric product contains trace amounts of toxic monomers, presenting a disposal problem. The products are also not biodegradable.

It is therefore an object of this invention to provide a pumpable suspension of a soluble alginate which can be easily used in an automated plant. It is a further object to provide a process for preparing a pumpable alginate suspension. Another object is to provide an alginate suspension which is non-toxic, nonflammable, freeze resistant, biodegradable, and does not contain any substances which interfere in the alginate application.

Other objects and advantages will be more fully apparent from the following disclosure and appended claims.

SUMMARY OF THE INVENTION

This invention relates to a suspension and slurry of a water soluble alginate and a process for preparing said suspension. The suspension can be pumped and thus metered to industrial systems. The slurry produced can be used for metered or automatic addition of the alginate to industrial systems.

The product of the invention is a non-alcohol containing liquid suspension of sodium alginate which is resistant to freezing and does not lose its functionality under freeze/thaw conditions. The process for producing the product does not require ammonia, caustic, or other obnoxious chemicals to be used to activate its swelling properties. The product requires less time for dissolution because according to the method of the invention the alginate is in a pre-swollen state within the suspension.

Other aspects and features of the invention will be more fully apparent from the following disclosure and appended claims.

DETAILED DESCRIPTION OF THE INVENTION AND PREFERRED EMBODIMENTS THEREOF

The water soluble alginates which can be used in the process and composition of this invention are commercially available as salts of alginic acid. These products are available in varying molecular weights as the final product viscosity is a function of alginic acid molecular weight. The process of manufacturing water soluble alginates outlined in this invention is applicable to all water soluble alginates whether of high or low viscosity.

It has been found that hydroxypropylated guar gum in low concentrations with a carboxymethylated cellulose will suspend soluble alginates in a propylene glycol/water mixture. The preferred propylene glycol is mono-propylene glycol, however, low molecular weight polypropylene glycols are also useful in the invention. The percentage of propylene glycol in the final mixture can be between 50 and 80% and is preferably between 50 and 60%. This percentage is based on total carrier blend, water being present to make 100%.

The hydroxypropylated guar and CMC which are used as the suspending agents are available commercially. Hydroxypropylated guar (HPG) is a chemically modified guar gum. It is manufactured by reacting the guar with propyleneoxide. The reaction conditions used effects the final molecular weight of the guar and determines the degree of substitution which is obtained. The amount of substitution obtained determines the final solubility properties of the guar in propylene glycol.

Carboxymethylated cellulose is a water soluble linear polymer derived by reacting cellulose hydroxyl groups with sodium monochloroacetate. The extent of the reaction of cellulose hydroxyls to form the derivative is called the degree of substitution (DS). Carboxymethylcelluloses are commercially available in a wide range of molecular weight, DS, and purity.

A wide range of the hydroxypropylated guars and CMCs can be used in this invention. The amount of hydroxypropylated guar needed is between about 0.2 and 5% (wt. basis) and preferably for economic reasons the guar is at a concentration of about 0.2 to 0.6%. The amount of CMC required is about 0.5 to 2.0% and preferably about 1.5 to 2.0%. It has also been found that a high concentration of hydroxypropylated guar can alone suspend alginates in a propylene glycol/water mixture; however, the concentrations of the HPG needed to satisfactorily suspend the alginates result in very viscous suspensions. To counter the viscosity increase, it was found that less water and consequently more propylene glycol could be used. The disadvantage of making a suspension using this technology is one of economics. Both the HPG and propylene glycol add to the price of the product, making the cost prohibitive as compared to the preferred embodiment of the invention.

The pumpable suspensions of this invention are preferably prepared by dry-mixing the alginate, hydroxypropylated guar and CMC to form a homogenous mixture. Preferably the particle size of the dry ingredients is such that 100% of the ingredients will pass through a 100 mesh screen. This mixture is slowly added to the propylene glycol. Agitation should be at a speed sufficient to prevent settling and excessive entrapment of air, which is easily determined for a particular formulation.

Preferably after all dry ingredients are well dispersed, the water is slowly added. At this point the suspension increases in viscosity. For this reason it is preferred that the water be added last. The final viscosity of the pumpable suspension is between 6,000 and 40,000 centipoise at 25° C. ±5° C. This range of viscosity is readily pumpable and can be metered into any system.

The features and advantages of the present invention will be more clearly understood by reference to the following examples, which are not to be construed as limiting the invention.

EXAMPLES

Example I

HPG, CMC, alginate and PG are mixed together according to the invention in various proportions to determine the effect on viscosity. Viscosity is determined by using a Brookfield viscometer, #6 spindle at 10 rpm. Results are shown in Table I:

TABLE I

| % HPG | % CMC | % Alginate | % PG | Viscosity (cps) |
|---|---|---|---|---|
| 0.2 | 1.7 | 20.0 | 50.0 | 20,000 |
| 0.3 | 2.1 | 30.0 | 72.0 | 9,000 |
| 0.6 | 1.4 | 20.0 | 58.0 | 35,000 |
| 0.7 | 2.0 | 24.0 | 68.0 | 10,000 |

Example II

Formulations with the varying percentages of PG and other ingredients as shown in Table II are prepared. The consistency and stability are measured for at least two months. Two months is considered the minimal time acceptable because most industries turn over their inventory within this time period. The 50% PG solution, which would be suspected to be the least stable is checked for stability for 6 months. The stability is determined by observing the suspensions for signs of separation. Results are shown in Table II.

TABLE II

| % HPG | % CMC | % Alginate | % PG | Comments |
|---|---|---|---|---|
| 0.2 | 1.7 | 20.0 | 50.0 | smooth paste, stable |
| 0.3 | 2.1 | 30.0 | 72.0 | smooth paste, stable |
| 0.6 | 1.4 | 20.0 | 58.0 | smooth paste, stable |
| 0.7 | 2.0 | 24.0 | 68.0 | smooth paste, stable |

Example III

Suspensions are formulated as above with 50% PG, which would be expected to be the least resistant to freezing of the suspensions tested because it contains the least amount of propylene glycol and the most water. The mixture is exposed to gradually decreasing temperatures for a period of at least 24 hours. Stability is determined by observing the suspensions for signs of separation. Resultant stability is shown in Table III.

TABLE III

| Temperature (°F.) | Comments |
|---|---|
| 75 | stable |
| 65 | stable |
| 55 | stable |
| 45 | stable |
| 35 | stable |
| 25 | stable |
| 10 | no separation |

Example IV

A comparison is performed between the time required to completely swell various dry alginate products and the liquid suspensions of the invention. The alginates tested are HV (high viscosity dry alginate); MV (medium viscosity dry alginate) and LV (low viscosity dry alginate), each obtained from Kelco Co. (San Diego, Calif.). Each of these dry alginates and the suspension of the invention are placed in a 1.0% solution in water, and the time to swell completely is measured in minutes. The results are shown in Table IV.

TABLE IV

| Alginate | Time to Completely Swell (1.0% soln.) |
|---|---|
| HV | 20 |
| MV | 15 |
| LV | 15 |
| Liquid | 5 |

While the invention has been described with reference to specific embodiments thereof, it will be appreciated that numerous variations, modifications, and embodiments are possible, and accordingly, all such variations, modifications, and embodiments are to be regarded as being within the spirit and scope of the invention.

What is claimed is:

1. A process of preparing a pumpable suspension of a water soluble alginate, comprising combining said alginate with hydroxypropylated guar, carboxymethylated cellulose, propylene glycol and water.

2. The process of preparing a pumpable suspension of a water soluble alginate according to claim 1, wherein alginate, hydroxypropylated guar and carboxymethylated cellulose are added to propylene glycol to form a first mixture, said first mixture is agitated, and then water is added to said agitated mixture.

3. The process of preparing a pumpable suspension of a water soluble alginate according to claim 1, wherein said pumpable suspension comprises about 15 to 35% alginate, about 0.2 to 5% hydroxypropylated guar, about 0.5 to 2.0% carboxymethylated cellulose and about 50 to 80% propylene glycol.

4. The process of preparing a pumpable suspension of a water soluble alginate according to claim 3, wherein said pumpable suspension comprises about 0.2 to 0.6% hydroxypropylated guar, about 1.5-2.0% carboxymethylated cellulose and about 50 to 60% propylene glycol.

5. The process of preparing a pumpable suspension of a water soluble alginate according to claim 1, wherein the water soluble alginate is selected from the group consisting of water soluble salts of alginic acid.

6. The process of preparing a pumpable suspension of a water soluble alginate according to claim 1, wherein the water soluble alginate is selected from the group consisting of the sodium salt, the potassium salt and the ammonium salt of alginic acid.

7. A process of preparing a pumpable suspension of a water soluble alginate, comprising combining said alginate with hydroxypropylated guar, propylene glycol and water.

8. A pumpable suspension of a water soluble alginate, free of flammable solvents or toxic monomers, comprising a carrier system of propylene glycol/water, wherein the propylene glycol content is from about 50 to 80%; and said system contains about 0.5 to 5% hydroxypropylated guar by weight, about 0.5 to 2.0% carboxymethylated cellulose by weight and between about 15 to 35% water soluble alginate by weight.

9. The pumpable suspension of a water soluble alginate according to claim 8, comprising about 0.2 to 0.6% hydroxypropylated guar, about 1.5-2.0% carboxymethylated cellulose and about 50 to 60% propylene glycol.

10. The pumpable suspension of a water soluble alginate according to claim 8, wherein the water soluble alginate is selected from the group consisting of the sodium salt, the potassium salt, the ammonium salt, and other water soluble salts of alginic acid.

* * * * *